United States Patent
Largent

(10) Patent No.: US 8,708,065 B2
(45) Date of Patent: Apr. 29, 2014

(54) VESSEL TO CONDITION DRY DRILL CUTTINGS

(75) Inventor: David Largent, Cleveland, TX (US)

(73) Assignee: National Oilwell Varco, L.P., Houston, TX (US)

(*) Notice: Subject to any disclaimer, the term of this patent is extended or adjusted under 35 U.S.C. 154(b) by 382 days.

(21) Appl. No.: 12/779,991

(22) Filed: May 14, 2010

(65) Prior Publication Data

US 2010/0307834 A1    Dec. 9, 2010

Related U.S. Application Data

(60) Provisional application No. 61/183,766, filed on Jun. 3, 2009.

(51) Int. Cl.
  *E21B 21/07* (2006.01)
  *E21B 21/06* (2006.01)

(52) U.S. Cl.
  USPC .......................................... 175/208; 175/206

(58) Field of Classification Search
  USPC ........... 175/206, 207, 208, 218, 209, 66, 210, 175/211, 212, 213, 214, 215, 216, 217; 239/567, 550, 547, 726, 548, 549; 96/155, 203, 220, 52, 53, 200, 64, 197, 96/274, 230, 243, 267, 311, 207; 95/230, 95/90, 108; 34/282, 359; 134/68
  See application file for complete search history.

(56) References Cited

U.S. PATENT DOCUMENTS

| | | | | |
|---|---|---|---|---|
| 952,636 A * | 3/1910 | Rea et al. | | 175/206 |
| 2,173,844 A * | 9/1939 | Houdry | | 208/146 |
| 2,327,497 A * | 8/1943 | Burch et al. | | 175/208 |
| 2,851,097 A * | 9/1958 | Ledgett | | 159/4.01 |
| 2,857,055 A * | 10/1958 | Glasgow | | 96/168 |
| 3,357,476 A * | 12/1967 | Tofflemire | | 159/4.01 |
| 3,688,781 A * | 9/1972 | Talley, Jr. | | 134/56 R |
| 3,920,424 A * | 11/1975 | Estep et al. | | 96/207 |
| 4,139,462 A * | 2/1979 | Sample, Jr. | | 210/774 |
| 4,208,285 A * | 6/1980 | Sample, Jr. | | 210/180 |
| 4,424,068 A * | 1/1984 | McMillan | | 95/243 |
| 4,649,655 A * | 3/1987 | Witten | | 34/135 |
| 4,683,963 A * | 8/1987 | Skinner | | 175/66 |
| 5,300,222 A * | 4/1994 | Broussard, Sr. | | 210/202 |
| 5,890,549 A * | 4/1999 | Sprehe | | 175/71 |
| 5,900,137 A * | 5/1999 | Homan | | 210/85 |
| 5,955,036 A * | 9/1999 | Seyffert et al. | | 422/139 |
| 6,170,580 B1 * | 1/2001 | Reddoch | | 175/66 |
| 6,328,118 B1 * | 12/2001 | Karigan et al. | | 175/66 |
| 7,156,193 B2 * | 1/2007 | Swartout | | 175/66 |
| 7,207,399 B2 * | 4/2007 | Duhe et al. | | 175/66 |

(Continued)

OTHER PUBLICATIONS

For the American Heritage Dictionary definition: around. (n.d.) The American Heritage® Dictionary of the English Language, Fourth Edition. (2003). Retrieved May 13, 2013 from http://www.thefreedictionary.com/around.*

*Primary Examiner* — Brad Harcourt
*Assistant Examiner* — Wei Wang
(74) *Attorney, Agent, or Firm* — Amerson Law Firm, PLLC

(57) ABSTRACT

Dry earthen material from an oil/gas well drilling rig is injected into an elongated vessel with a number of rings of nozzles that are arranged in conjunction with a number of water and/or chemical spray nozzles and a baffling system to knock the air/gas out of the cuttings and vent it. A relatively thick muddy waste is produced which may be easily disposed of.

26 Claims, 3 Drawing Sheets

(56) References Cited

U.S. PATENT DOCUMENTS

| | | |
|---|---|---|
| 7,377,336 B2 * | 5/2008 | Duhe et al. .................. 175/66 |
| 7,575,073 B2 * | 8/2009 | Swartout .................... 175/209 |
| 7,578,883 B1 * | 8/2009 | Williams et al. ............ 118/715 |
| 7,749,310 B2 * | 7/2010 | Lagerstedt et al. ........... 95/270 |
| 2007/0185347 A1 * | 8/2007 | Wonders et al. ............ 562/414 |
| 2008/0190668 A1 * | 8/2008 | Swartout .................... 175/207 |
| 2011/0000372 A1 * | 1/2011 | Lagerstedt et al. ........... 95/270 |

* cited by examiner

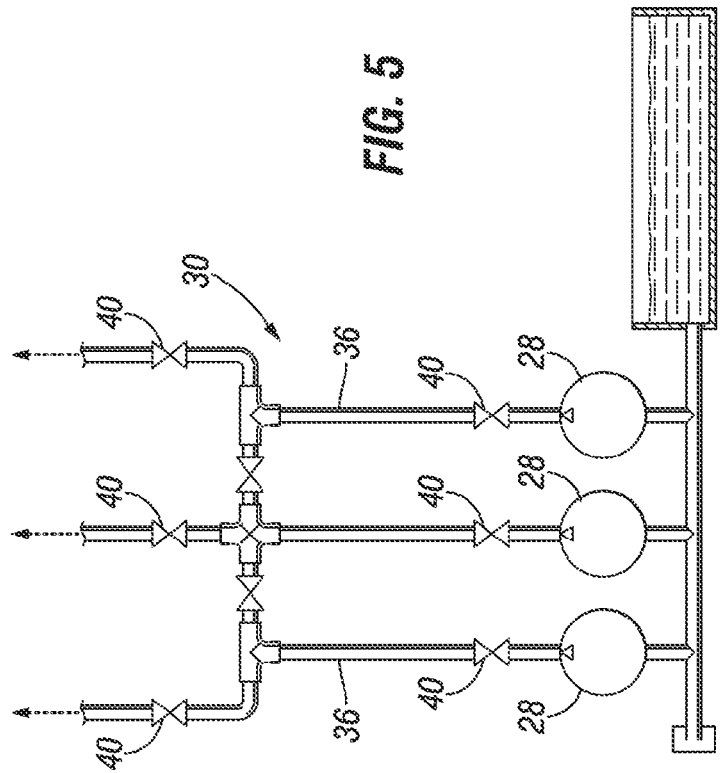
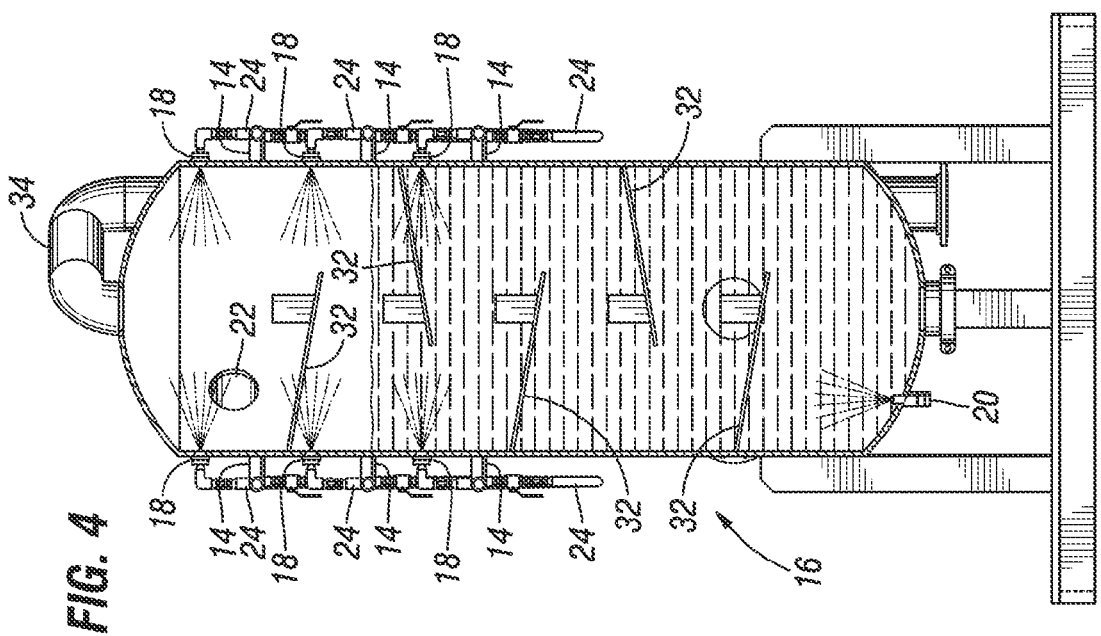

VESSEL TO CONDITION DRY DRILL CUTTINGS

This application claims priority from U.S. provisional patent application Ser. No. 61/183,766, filed on Jun. 3, 2009, which is incorporated herein by reference.

BACKGROUND OF THE INVENTION

1. Field of the Invention

This invention relates to the processing of the cuttings when drilling for hydrocarbons using a gaseous drilling fluid.

2. Description of the Related Art

It is well known there are many methods in the area of processing for 'normal' oil & gas well earthen and drilling fluid laden drilling mud when using a liquid drilling fluid. However, far fewer methods are known in the field of processing the dry drilling cuttings generated when using gaseous drilling fluids, while using a wet cuttings treatment process to dispose of them.

However, certain drilling applications require that all or part of an oil and gas well be drilled with compressed air or other gaseous drilling fluid, say for example, nitrogen or natural gas, used as the lifting medium for the drilled cuttings An air/gas discharge pipe 15 typically called a "Blooie Line" is typically attached to the well head blow out preventer 13 for venting the returning air/gas/drilled cuttings mixture at a distance from the drilling rig site for either discharge or flaring purposes.

When discharging only, the material is sent to an earthen pit for collection of the discard. Environmental regulations have precluded the use of earthen pits in some areas and in others, a drive to reduce location size has prompted oil and gas operators to seek alternative solutions for containing, collecting and managing this discard stream.

BRIEF SUMMARY OF THE INVENTION

A pressure rated collection vessel "mud/gas separator" may be employed to segregate the air/gas stream from the solids. The vessel is fitted with specially designed 'quench' nozzles which allows for the capture of returning solids within the vessel and return of these solids into the traditional drilling rig fluid process system. Air and gas exit the vessel from another port and are diverted to a flare/containment box.

In particular, what is disclosed herein is an elongate, vertically mounted and generally cylindrical vessel for processing dry earthen drilling cuttings from an earth boring operation. The vessel separates the cuttings into a liquid slurry and gas, using nozzles in fluid communication with a multiple number of fluid supply rings mounted inside.

Each fluid supply ring has a number of injection nozzles spaced around the inside circumference of the vessel between its upper end and its lower end to wet the earthen drilling cuttings so that gravity aids the separation into the liquid slurry and the gas.

Preferably, each fluid supply ring is separately and independently supplied with a flushing fluid, although various manifold schemes may also be utilized to interconnect them. The vessel may have different numbers and sizes of nozzles and also different numbers of rings. In addition, a variety of quench fluids may be used, but in particular, water may be preferred. A typical flow rate for a typical nozzle for this type of vessel using water as the quenching agent would be, for example, 60 to 85 GPM at 35-45 PSI, per nozzle.

BRIEF DESCRIPTION OF THE DRAWINGS

FIG. 4 is a cross section view of a typical mud/gas separator of the present invention showing a typical internal arrangement with three rings of nozzles.

FIG. 5 is a schematic diagram illustrating the plumbing arrangement for supplying flushing fluid to the nozzles.

DETAILED DESCRIPTION OF THE INVENTION

Figure 1:
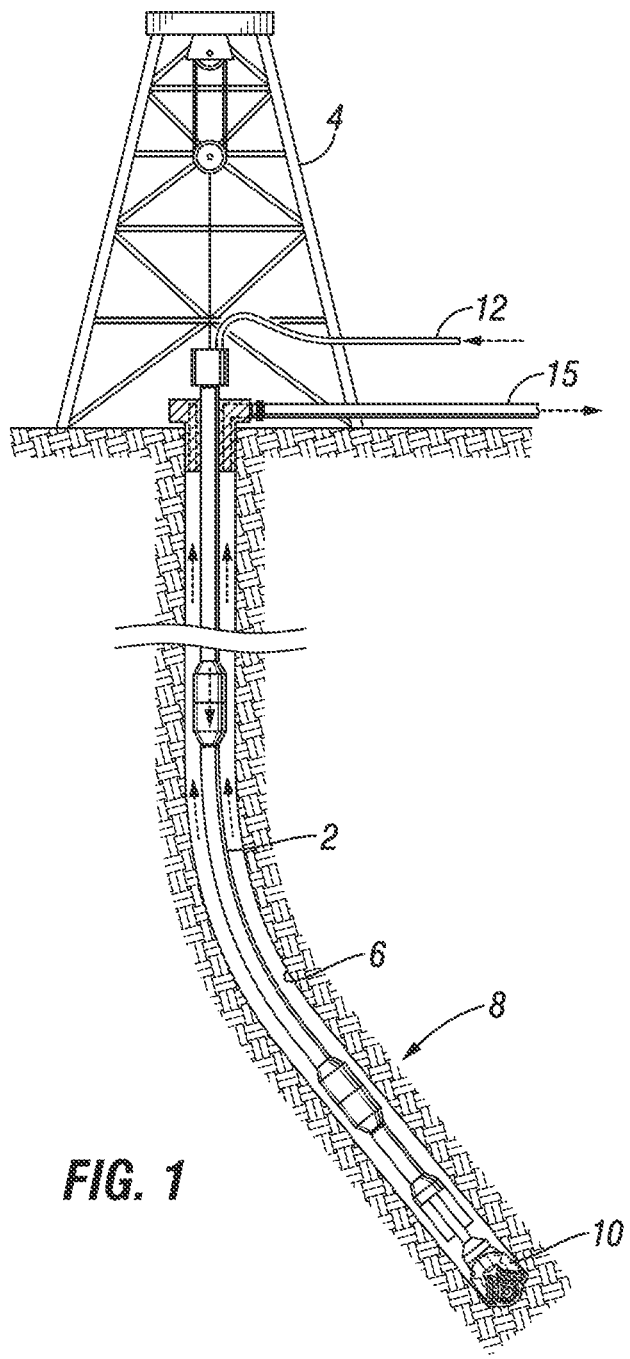
FIG. 1 is a schematic representation of a drill rig in operation where the separator system of the present invention may be used.
Figure 2:
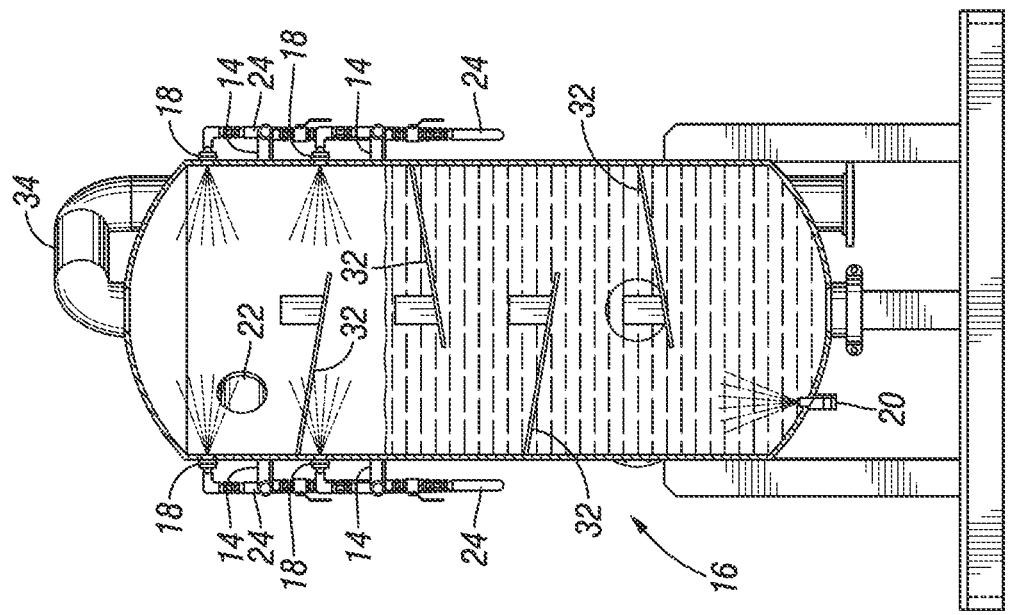
FIG. 2 is an elevation view of a typical mud/gas separator of the present invention showing a typical 'two quench ring' configuration, and a portion of the exterior plumbing.

FIG. 1 shows a drill rig which uses air or other gaseous fluids to flush the drilled cuttings to the surface. The rig typically comprises a mast 4 (sometimes called a derrick) which suspends a drill string 2 in a well bore 6. Downhole tools 8 may be in the drill string 2 for making measurements and the like, and finally includes a drill bit 10 which performs the actual drilling. An air supply line 12 provides gaseous drilling fluid under pressure to flush cuttings from the drill bit 10 up the annulus of the well bore 6 and out a discharge line 15, commonly known as a "Blooie line". The "Blooie line" 15 carries the earth cuttings to a generally cylindrical treatment vessel 16.

In one aspect of the invention multiple 'rings' 14 having a plurality of injection nozzles 18 spaced around the inside circumference near the top end of the treatment vessel 16. The vessel 16 is typically mounted on its end so that gravity aids the separation process. Each ring 14 may be separately and independently supplied with a flushing fluid, typically water. Although typically supplied to groups of rings 14, the supply to each ring may be adjusted independently, as will be described.

Figure 3:
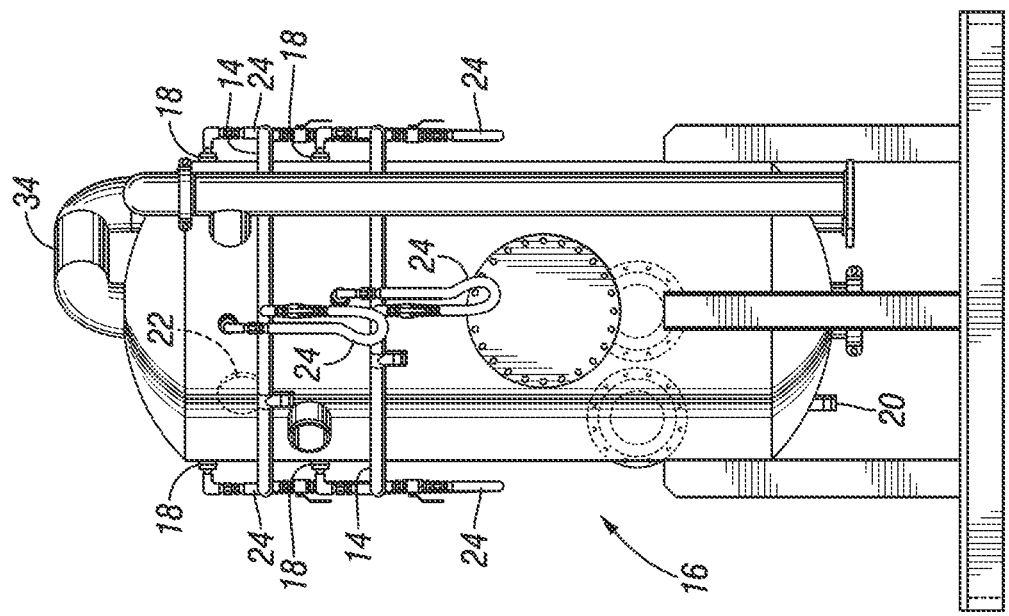
FIG. 3 is a cross-section elevation view of a typical mud/gas separator of the present invention showing an internal arrangement with two quench rings of nozzles, and the baffles and the internal plumbing of the separator of the present invention.

Each ring 14 may have multiple injection nozzles 18, but preferably has four injection nozzles 18 each, at preferably about 90° spacing, but they may also be located in other intervals. The nozzles 18 capture or 'quench' the solids coming from the 'Blooie Line' 15. Two sets of rings 14 may be used as illustrated in FIG. 3, or three sets of rings, as illustrated in FIG. 4.

The injection nozzles 18 may typically be 2 inches in diameter and may be fitted with steel bars (not shown) to shape the fluid trajectory for better distribution within the vessel.

For the nozzles 18 as illustrated, an optimum flow rate is 60-85 gallons per minute per nozzle at 35-40 psi. However, it is anticipated that larger vessels may require higher flow rates.

One or more additional spray nozzles 20 at the bottom of the tank may be used to agitate the solids that settle to the bottom of the vessel.

Air, and possibly gas as well, in addition to the drilled cuttings enter the vessel 16 through a pipe 22 attached to the 'Blooie line' 15 at rig's well head.

Water and/or chemicals are injected through the nozzles 18 via a series of hydraulic hoses 24 fitted to a 4-inch vertical pipe column (not shown) and fed by one or more centrifugal pumps 28. The pumps 28 may supply the water and/or chemicals through a manifold system 30 of plumbing 36 and valves 40.

The injected water and/or chemicals creates a 'blanket' of liquids which prevents the solids from exiting with the air/gas mixture through exhaust pipe 34.

The 'quenched' solids flow over a series of baffles 32 within the vessel 16 and collect at the bottom.

The nozzle 20 at the bottom of the vessel 16 is used to agitate the solids that have settled during the quench process. This nozzle 20 may be used with drilling mud, water, chemicals or air.

The liquid and solids flow by gravity from the vessel 16 into a conventional and well known drilling fluid processing system, whereby the solids are removed via a separate and sequential solids control system and the fluid returned to the rig for use again.

During operation, a semi-static 'mud ring' or fluid level in the vessel 16 prevents discharge of the air/gas mixture from the bottom and forces it to the top of the vessel 16; thence to a flare box (not illustrated) which may be necessary if natural gas is mixed with the cuttings.

Periodic surges in pressure caused by the 'bleed off' slightly alter the fluid height within the vessel and surge or flush the fluid from the vessel 16. This feature prevents the solids from settling within the vessel 16, thus eliminating the need for dismantling or cleaning while in use.

This system works well in cases where the rigs drilling penetration rate has exceeded 300 feet per hour (fph) with a 6.875 inch diameter drill bit. Air process rates may be 1800 cfm or higher in this scenario.

When the rig converts from gas circulation to drilling fluid circulation, the vessel 16 can be used as a traditional mud/gas separator Whereas the present invention has been described in particular relation to the drawings attached hereto, it should be understood that other and further modifications apart from those shown or suggested herein, may be made within the scope and spirit of the present invention.

What is claimed is:

1. A vessel that is adapted to receive and process drilling cuttings from an earth boring operation and to separate said processed drilling cuttings into a separated gas and a liquid slurry mixture, the vessel comprising:
    a plurality of fluid supply rings, wherein each of said plurality of fluid supply rings is adapted to receive flushing fluid from a flushing fluid supply system;
    a plurality of fluid injection nozzles, wherein each of said plurality of fluid injection nozzles is adapted to receive flushing fluid from at least one of said plurality of fluid supply rings and to spray said received flushing fluid on drilling cuttings that are received by said vessel so as to generate said liquid slurry mixture, said liquid slurry mixture comprising said flushing fluid and solids material comprising said received drilling cuttings;
    a first segmental flow baffle extending from a first side of said vessel; and
    a second segmental flow baffle extending from a second side of said vessel that is substantially opposite of said first side, wherein said first segmental flow baffle is positioned above and overlaps said second segmental flow baffle.

2. The vessel of claim 1, wherein at least a first one of said plurality of fluid supply rings is adapted to supply flushing fluid to at least four fluid injection nozzles.

3. The vessel of claim 2, wherein said at least four fluid injection nozzles are substantially equally spaced around a circumference of said vessel.

4. The vessel of claim 1, further comprising a plurality of hoses, wherein each of said plurality of hoses is adapted to provide fluid communication between one of said plurality of fluid injection nozzles and one of said plurality of fluid supply rings.

5. The vessel of claim 4, wherein at least one of said plurality of hoses is a flexible hydraulic hose.

6. The vessel of claim 1, wherein said plurality of fluid supply rings comprises at least two fluid supply rings.

7. The vessel of claim 1, further comprising a drilling cuttings inlet that is adapted to receive drilling cuttings from a drilling cuttings discharge line of a well head.

8. The vessel of claim 7, wherein said vessel is adapted to receive, through said drilling cuttings inlet, at least one of air and natural gas from said drilling cuttings discharge line of said well head.

9. The vessel of claim 8, further comprising an outlet that is adapted to vent said separated gas from said vessel, said separated gas comprising said at least one of air and natural gas.

10. The vessel of claim 1, wherein said vessel is a vertically oriented elongate vessel having a substantially cylindrical shape.

11. The vessel of claim 10, wherein each of said first and second segmental flow baffles is downwardly angled so as to direct said flow of liquid slurry mixture from a top of said vessel to a bottom of said vessel during operation of said vessel.

12. The vessel of claim 11, further comprising an agitation nozzle proximate said bottom of said vessel, wherein said agitation nozzle is adapted to agitate said solids that settle to said bottom of said vessel during said operation.

13. The vessel of claim 12, wherein said agitation nozzle is adapted to receive a flow of at least one of air, water, chemicals and drilling mud.

14. The vessel of claim 11, wherein said vertical orientation of said vessel is adapted to facilitate a gravity flow of said liquid slurry mixture to said bottom of said vessel during said operation.

15. The vessel of claim 1, wherein said first and second segmental flow baffles are adapted to facilitate a back-and-forth flow of said liquid slurry mixture across said vessel.

16. The vessel of claim 1, wherein at least one of said plurality of fluid supply rings are disposed around an outside of said vessel.

17. The vessel of claim 1, wherein at least one of said plurality of fluid injection nozzles penetrates a wall of said vessel.

18. The vessel of claim 1, wherein an overflow edge of said first segmental flow baffle is positioned above said second segmental flow baffle so that said liquid slurry mixture flows onto said second segmental flow baffle from said first segmental flow baffle.

19. The vessel of claim 1, further comprising a third segmental flow baffle positioned below said second segmental flow baffle and extending from said first side of said vessel, wherein said second segmental flow baffle extends between said first and third segmental flow baffle.

20. A system for processing drilling cuttings from an earth boring operation, the system comprising:
    a vessel that is adapted to receive drilling cuttings, process said drilling cuttings, for processing and separate said drilling cuttings into a separated gas and a liquid slurry mixture comprising a flushing fluid and solids material comprising said drilling cuttings, wherein said vessel is a vertically oriented elongate vessel having a substantially cylindrical shape and comprises a first segmental flow baffle extending from a first side of said vessel and a second segmental flow baffle extending from a second side of said vessel that is substantially opposite of said first side, wherein said first segmental baffle is positioned above and overlaps said second segmental flow baffle;

first and second pluralities of fluid injection nozzles, wherein each injection nozzle of said first and second pluralities of injection nozzles is adapted to spray a flow of said flushing fluid on drilling cuttings that are received by said vessel so as to generate said liquid slurry mixture;

a first fluid supply ring that is adapted to supply said flushing fluid to said first plurality of injection nozzles;

a second fluid supply ring that is adapted to supply said flushing fluid to said second plurality of injection nozzles; and a flushing fluid supply system that is adapted to supply flushing fluid to said first and second fluid supply rings.

21. The system of claim 20, wherein said flushing fluid supply system comprises a manifold, a plurality of valves, and at least one pump.

22. The system of claim 20, wherein said flushing fluid supply system is adapted to independently adjust a supply of flushing fluid to each of said first and second fluid supply rings.

23. The system of claim 20, wherein at least one of said first and second pluralities of fluid injection nozzles comprises at least four fluid injection nozzles that are substantially equally spaced around a circumference of said vessel.

24. The system of claim 20, wherein each of said first and second segmental flow baffles is downwardly angled so as to direct said flow of liquid slurry mixture from a top of said vessel to a bottom of said vessel during operation of said system.

25. The system of claim 24, wherein said vessel further comprises an agitation nozzle proximate said bottom of said vessel, said agitation nozzle being adapted to agitate said solids that settle to said bottom of said vessel during said operation.

26. The system of claim 20, wherein said vessel further comprises a drilling cuttings inlet that is adapted to receive drilling cuttings and at least one of air and natural gas from a drilling cuttings discharge line of a well head.

* * * * *